United States Patent [19]
Roe

[11] Patent Number: 5,988,431
[45] Date of Patent: Nov. 23, 1999

[54] DISK VENDING MACHINE

[76] Inventor: Uzoma Roe, 7421 S. Oglesby, Chicago, Ill. 60649

[21] Appl. No.: 08/786,650

[22] Filed: Jan. 21, 1997

[51] Int. Cl.[6] .................................................. B65G 59/00
[52] U.S. Cl. ........................ 221/132; 221/123; 221/277; 221/250
[58] Field of Search ..................................... 221/123, 131, 221/132, 277, 250, 79, 120, 121, 122, 209, 210

[56] References Cited

U.S. PATENT DOCUMENTS

| | | | |
|---|---|---|---|
| 1,577,592 | 3/1926 | Robertson et al. | 221/15 |
| 2,099,267 | 11/1937 | Hackett | 221/17 |
| 2,241,662 | 5/1941 | Garner et al. | 312/36 |
| 2,581,170 | 1/1952 | Carlson | 221/121 |
| 4,519,522 | 5/1985 | McElwee | 221/13 |
| 4,654,799 | 3/1987 | Ogaki et al. | |
| 4,674,055 | 6/1987 | Ogaki et al. | |
| 4,860,876 | 8/1989 | Moore et al. | 194/205 |
| 4,893,727 | 1/1990 | Near | 221/81 |
| 4,949,257 | 8/1990 | Orbach | |
| 4,954,697 | 9/1990 | Kokubun et al. | |
| 5,042,686 | 8/1991 | Stucki | 221/13 |
| 5,415,319 | 5/1995 | Rosolia | |
| 5,445,295 | 8/1995 | Brown | |

*Primary Examiner*—Christopher P. Ellis
*Assistant Examiner*—Steven B. McAllister
*Attorney, Agent, or Firm*—Patula & Associates

[57] ABSTRACT

A vending machine system is disclosed for vending computer storage media and specifically a computer floppy disk. The vending machine includes a housing having a disk carousel therein. The disk carousel holds a plurality of disks in a vertical position. Upon a user selecting a disk to be purchased, a signal is sent to a motor which rotates a carousel positioning the selected disk in front of the dispenser opening at which time a pusher element is actuated pushing a disk out through the dispenser opening.

12 Claims, 7 Drawing Sheets

DISK VENDING MACHINE

This invention relates to vending machines and vending machine systems for electronic and digital products and, more particularly, vending machines for dispensing computer related products.

BACKGROUND OF THE INVENTION

Personal computers today are not only popular, they have become in many ways a necessity for businesses, families, educational institutions and individuals involved with those various activities. Hard drive memory capacities on personal computers, however, are limited. A number of technologies are available to assist with enhanced use of memory space and flexibility in using and transmitting to other people, businesses or locations information stored on one's computer. The most popular of these is the computer disk.

A computer disk is a small, wafer-thin object on which information can be stored electronically. Disk sizes and formats vary. When personal computers first became popular, the five and one quarter inch floppy disk was most frequently used. That disk, now thought to be too large and too easily damaged because of its flexibility, was replaced by a smaller, more rigid three and one-half inch disk, more commonly known as a diskette. Additionally, compact laser disks are also used to store information digitally for electronic transmission via computer, affording the same if not enhanced features as the diskette.

A key feature of the computer disk technologies is their portability. Particularly with the increasing use of laptop computers, the smaller, lighter weight and more durable the information storage unit is, the more reliable and useful one's computer becomes. Consequently, the downloading and transfer of information via personal computers has increased dramatically and with it, the need for memory has also increased. The need for more memory is addressed significantly by the computer disk technologies. Presently, these disks are available from commercial retail operators, but the locations and office hours of these retailers is limited.

The present invention focuses on addressing the availability of computer disks through vending machine as opposed to retail access. Vending machines as vending systems have been disclosed for a wide variety of products. U.S. Pat. No. 4,954,697, for example, teaches a vending apparatus comprised of a cabinet, product data memory storage means, visual or audio sampling means, selection means, means for paying for the item and dispensing means. One object of this invention is to vend automatically a great variety of goods from a single machine. However, in its attempt to cover a broad base of goods, the vending machine disclosed is too large, too complicated and too impractical to service the modern market of consumers. This invention does not address computer related products but, rather, product variety as its primary inventive aspect.

U.S. Pat. No. 5,415,319 discloses a vending machine specifically designed for audio works. It is designed to allow the consumer to sample musical or other audio selections before actually purchasing the product, thereby filling a distinct gap in the vending machine market which otherwise does not allow for product sampling before purchase. This invention is a combination of relatively conventional vending machine mechanics with unconventional sound enhancement functions to allow for audio sampling of products dispensed. The present invention does not anticipate audio sampling of products to be dispensed through the vending machine.

There also is a body of prior art which addresses vending machines and vending systems pertaining to audiovisual and computer software products. In U.S. Pat. No. 5,445,295, for example, a vending machine is disclosed which dispenses audio compact disks, video cassettes and other electronic data storage devices. This patent, as with patent '697, involves sampling means for viewing or listening to a selection before it is selected. Consequently, the vending machine and system are much more expensive to manufacture and complicated compared to the present invention.

U.S. Pat. Nos. 4,654,799 and 4,674,055 involve automated computer software vending systems in which individual user consumers connect with a host system so that the consumer does not need any kind of a conventional data storage device but, rather, dials in to the host system either from an office location or modem and the software purchased is transmitted to the consumer via telecommunications. This technology serves a different function than the present invention in that it provides software, not memory tools such as storage disks, and transmits products purchased electronically by computer to computer connections rather than conventional vending machine purchase. Similarly, another automated merchandising system is disclosed in U.S. Pat. No. 4,949,257 comprised of software which allows for remote software purchases by dialing in to a host system for sampling selections and transmitting actual selections of software purchases, then transmitting the software selected directly from the host to the purchaser's computer. These systems do not address sale or vending of memory enhancing devices or products such as computer disks.

Although the prior art discussed here advances the art of vending machines and vending machine systems by making additional features available such as sound and video product sampling before actual selection, it does not relate to making computer memory enhancing products such as disks available specifically through vending machine means. Portable computer information storage means such as disks do not require product sampling before purchase, but would require specially designed vending systems for dispensing such products from a vending machine.

Therefore, one object of the present invention is to enhance the availability of computer memory through information storage disks made available by disk vending machines.

Another object of the present invention is to provide a vending machine which does not drop storage products to a dispensing bin, thereby avoiding the possibility of damage to the disk upon release from a storage rack.

Another object of the present invention is to provide a computer storage disk vending machine which is capable of dispensing a variety of disk storage devices.

Yet another object of the present invention is to increase computer use, computer memory capacities and convenience by making available vending machine access to information storage disks in compact, easy to manufacture, mechanically streamlined vending machines.

Still another object of the present invention is to improve upon computer disk availability by providing low cost vending machines for dispensing these disks.

SUMMARY OF THE INVENTION

The present invention is a computer disk vending machine comprised of at least one rotary carousel housed within a vending machine cabinetry having a front panel with at least one dispensing opening. Said rotary carousel is further defined as having a plurality of tracks inside the carousel for holding computer storage disks in place which are housed within retaining slots within said rotary carousel. Said disk vending machine is further comprised of a motor and gear system for rotating said rotary carousel, disk selection means connected to said motor and accessible for the consumer to indicate selection from the cabinetry exterior, security means for obstructing improper access to a disk in place on said tracks until released for purchase, ejection means for dispensing a disk from the cabinetry, and payment means for prompting the vending machine to receive a purchase request, said payment means also located on the cabinetry exterior and connected internally to said motor to trigger selection when proper payment is deposited within the machine. Upon deposit of payment and selection of a disk for purchase, said motor rotates the carousel so that the selected disk is positioned in front of the dispensing opening. The ejection means pushes the disk selected to be released and the rubber track outward, sliding in the track in the retaining slot, and collapsing the security means, until the disk is halfway out of the dispensing opening of the vending machine, at which time the consumer gently pulls the disk selected from the machine. The track recedes back into its fully retracted position on said carousel by camming action. In the preferred embodiment of the invention, a second carousel is located in parallel configuration relative to said first carousel, said second carousel having its own motor similarly utilized to allow for example one carousel for formatted disks and the second for unformatted disks.

Numerous other advantages and features of the invention will become readily apparent from the detailed description of the preferred embodiment of the invention, from the claims, and from the accompanying drawings, in which like numerals are employed to designate like parts throughout the same.

BRIEF DESCRIPTION OF THE DRAWINGS

A fuller understanding of the foregoing may be had by reference to the accompanying drawings, wherein.

DETAILED DESCRIPTION OF THE PREFERRED EMBODIMENT OF THE PRESENT INVENTION

Figure 1:
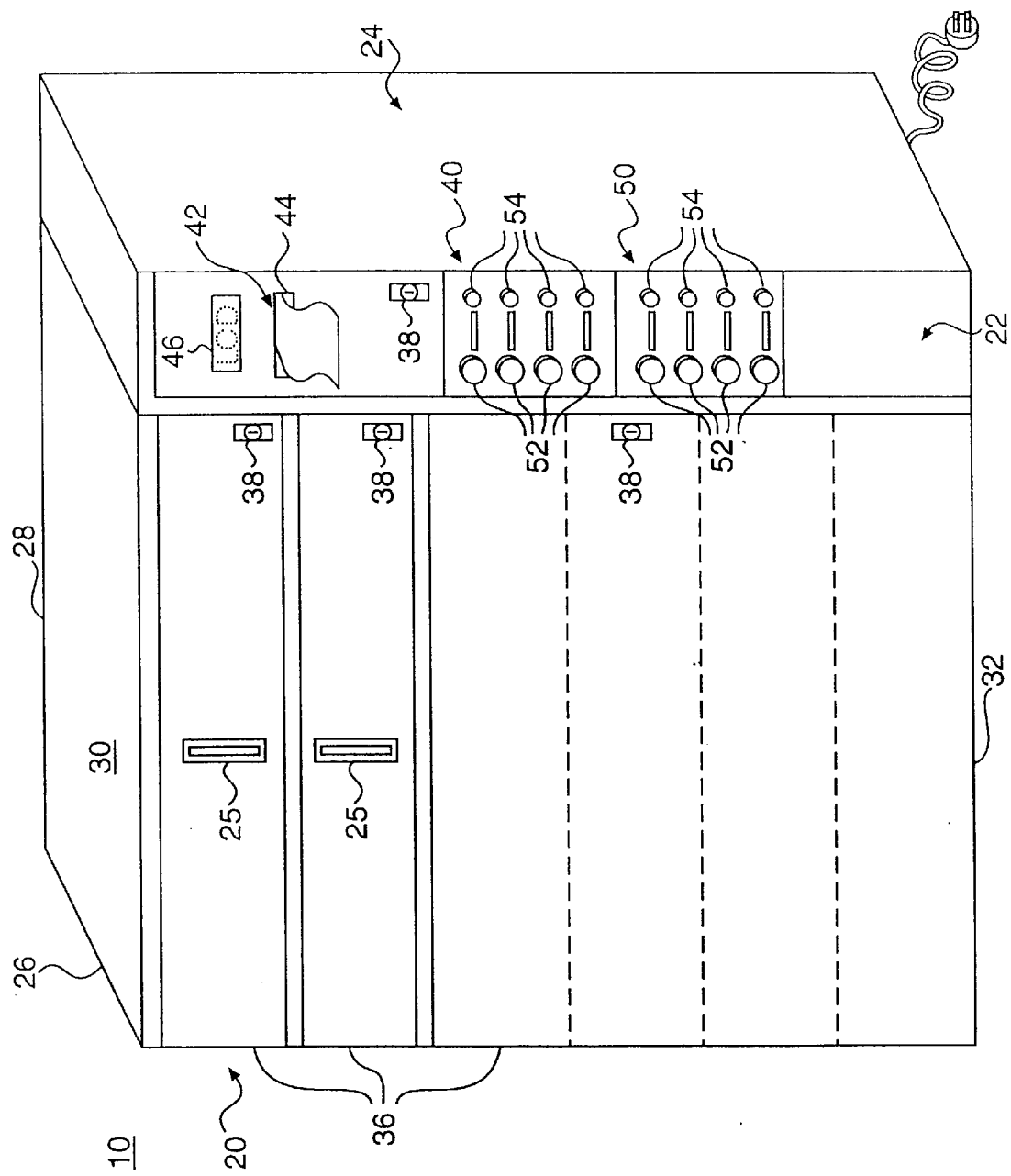
FIG. 1 is a front perspective view of the preferred embodiment of the present invention.

FIG. 1 is a front perspective view of the preferred embodiment of the present invention for vending machine 10. As can be seen, vending machine 10 includes a housing or a cabinetry 20 which includes a front wall 22, sidewalls 24 and 26, back wall 28, top wall 30 and bottom wall 32, thus defining an enclosure having shelves 34 therein (See FIG. 2). The shelves 34 divide the enclosure into various compartment 35. The compartments 35 are accessible through front doors 36 having locks 38 therein. The compartments enclosing the disk carousel have front walls which include a dispensing opening 25 therein so that the disk may pass therethrough to a user. The front wall 22 of housing 20 further includes user interface means 40 including payment means 42 comprising bill accepter 44 and LCD display 46 and selection means 50 comprising selection buttons 52 and indicator lights 54.

Figure 2:
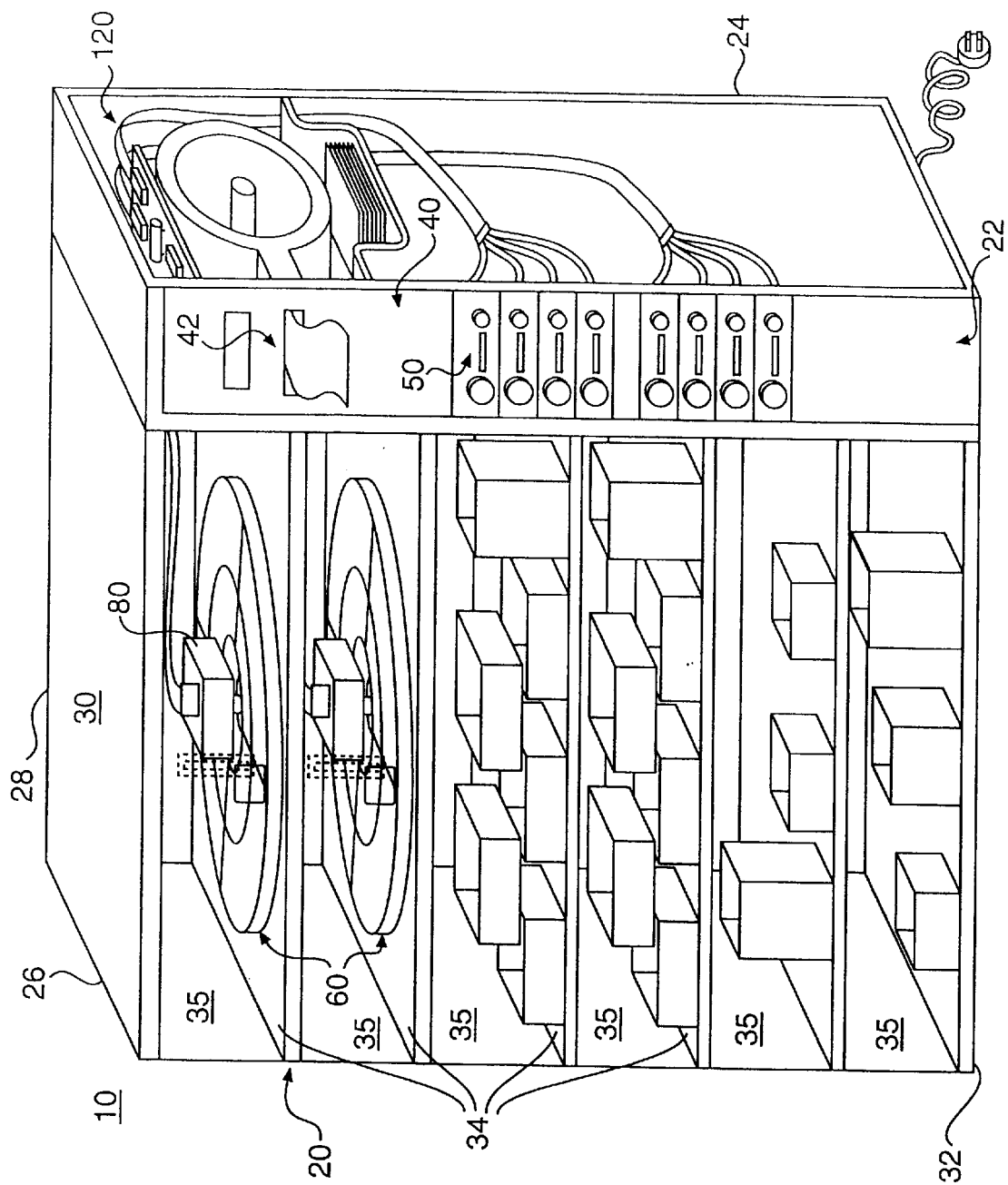
FIG. 2 is a front perspective skeletal view of the preferred embodiment of the present invention illustrating the elements inside the cabinetry.

Referring now to FIG. 2, invention 10 is illustrated in skeletal view such that the inside components of invention 10 can be seen through housing 20 which includes front wall 22, sidewalls 24 and 26, backwall 28, top wall 30 and bottom wall 32 and including shelves 34 forming compartments 35. User interface means 40 are also shown including payment means 42 and selection means 50. Inside housing 20 is shown the disk carousels 60 of the present invention, as well as carousel rotation means 80 and circuitry 120. The present invention is illustrated as including two disk carousels but it should be understood that any number of carousels may be utilized. Additionally, it is preferred but not necessary that housing 20 includes lower compartments which simply contain shelf space to provide a storage area for merchandise, etc., illustrated as a plurality of boxes.

Figure 3:
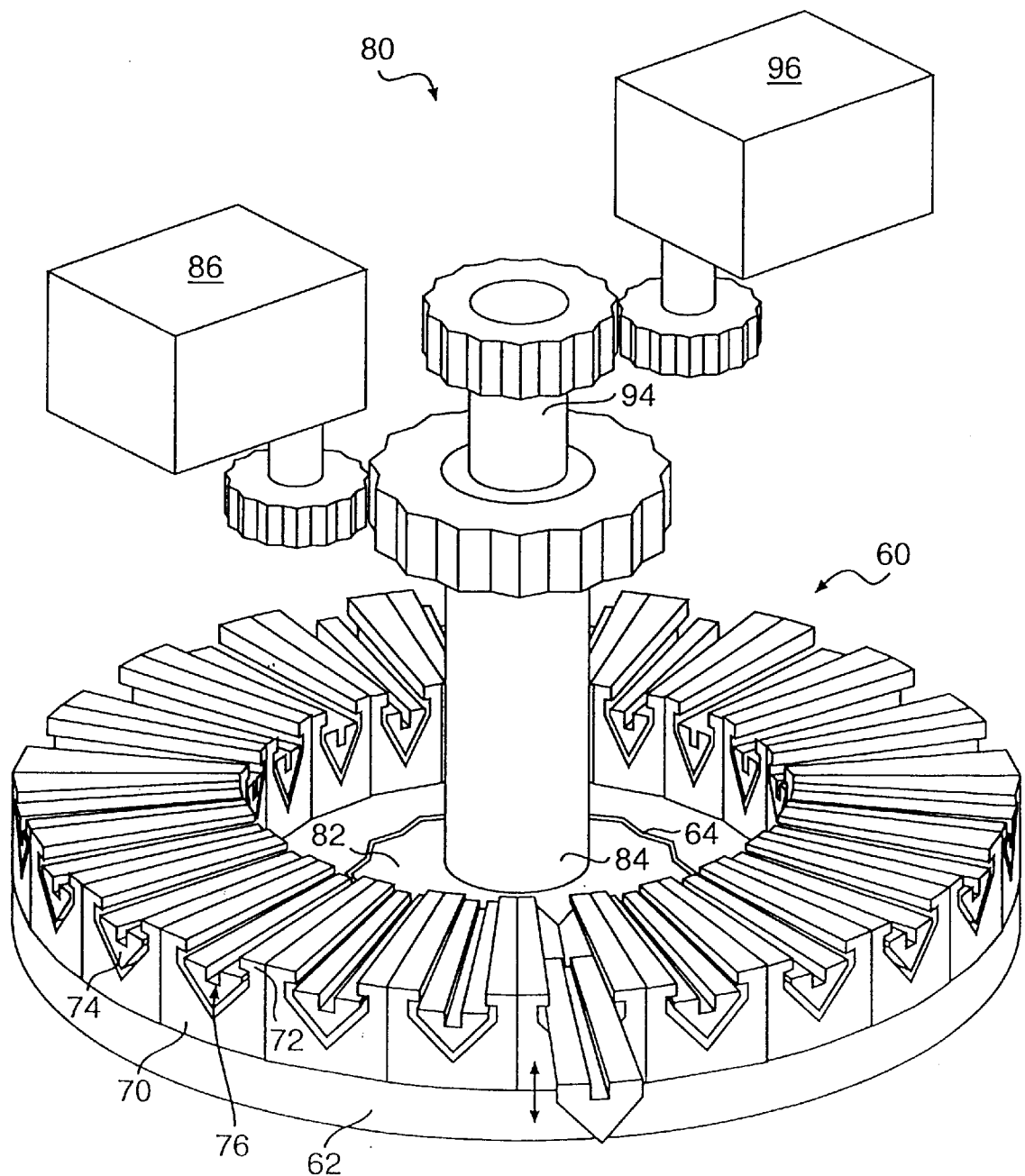
FIG. 3 is a perspective view of the carousel and rotation means of the present invention.

FIG. 3 illustrates a perspective view of the carousel 60 and rotation means 80 of the present invention. Carousel 60 which holds a plurality of disks in an upright position includes a carousel body 62 having a first gear receptacle 64 and a second gear receptacle 66 (see FIG. 6) immediately below the first gear receptacle 64. Carousel 60 further includes a plurality of retaining slots 70 including retaining fingers 72 and a plurality of inner tracks 74 containing a disk groove 76 which are housed within the retaining slots 70 and are prevented from dislodging by fingers 72. As describe herein, inner tracks 74 remain free to slide radially in retaining slots 70, as indicated by the double arrow drawn next to one of the inner tracks 74 illustrated partially extending from its retaining slot 70. Carousel rotation means 80 cooperatively associates with the carousel 60 via a first gear 82 which is received in the first gear receptacle 64. First gear 82 is connected to first gear shaft 84 which in turn is connected to a first motor 86 for rotation thereof. Similarly, a second gear 92 (see FIG. 6) is received in the second gear receptacle 66. The second gear 92 is connected to second gear shaft 94 which is coaxial with the first gear shaft 84. Second gear shaft 94 is connected to second motor 96 for rotation thereof. Preferably, carousel rotation means 80 are housed in a gear box 99 (See FIG. 4). It should be understood that motors 86 and 96 can be selectively disengaged from their respective drive shafts in any suitable manner known in the art of motors and drive trains, to allow for proper rotation of the carousel by either motor without interference from the other.

Figure 4:
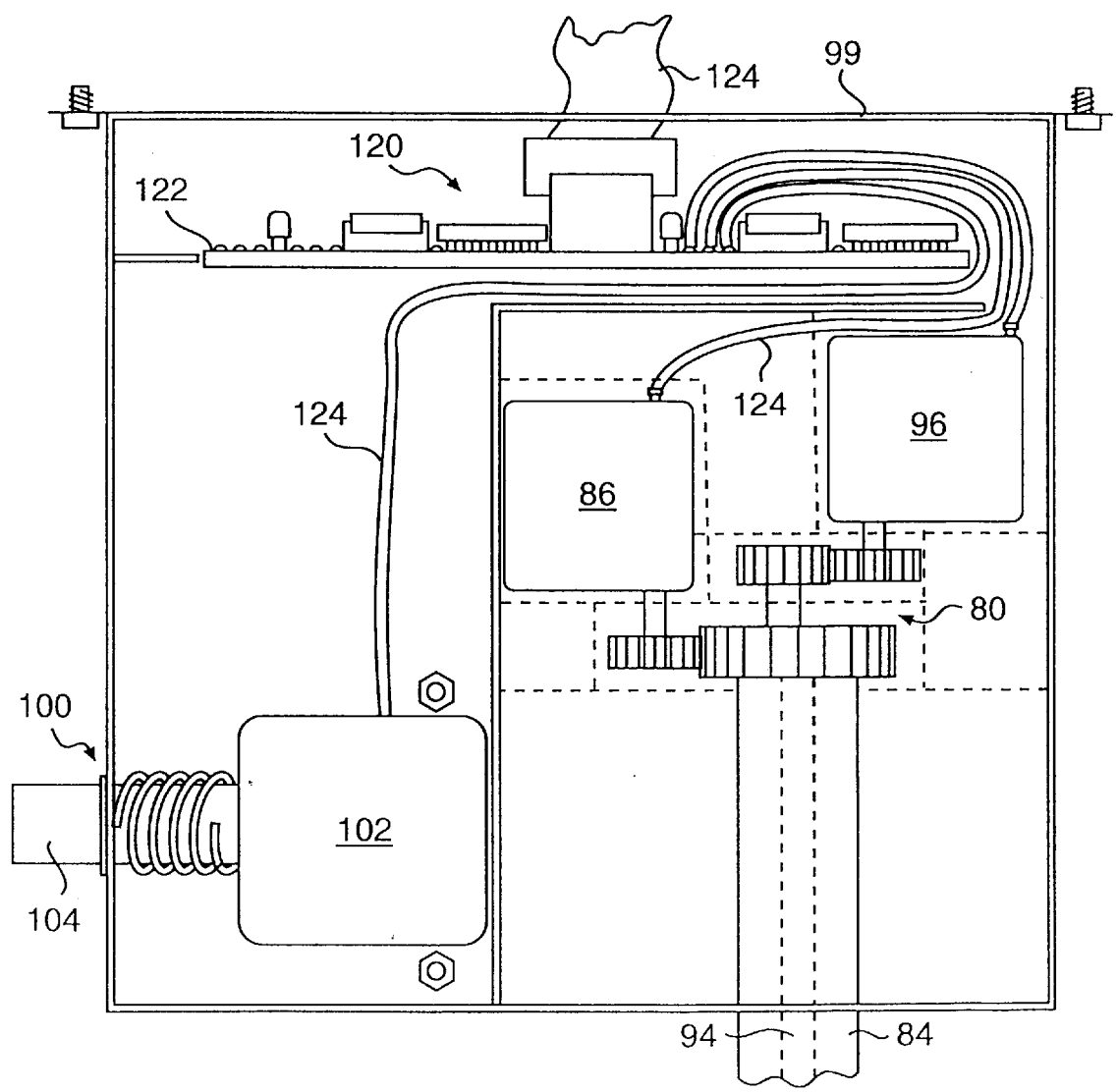
FIG. 4 is a front view of the rotation means and ejector means of the present invention.

FIG. 4 is a front view of the rotation means 80 and the ejector means 100 of the present invention 10, shown housed in gear box 99. Carousel rotation means 80 includes a first gear 82 (FIGS. 3, 6) attached to a first gear shaft 84 which in turn is rotated via first motor 86 in any suitable manner. Similarly, the second gear 92 (FIG. 6) is connected to second gear shaft 94 which is rotated by second motor 96 in any suitable manner. First gear shaft 84 is coaxial with second gear shaft 94 which is free to rotate independently therein, in any suitable manner such as through the use of bearing means. Ejection means 100 which is used to push a desired disk out the dispensing opening is comprised of a hydraulic piston 102 which actuates a pusher element 104 which in turn contacts the disk to dispense it from the housing 20. Circuitry 120 is further shown comprising a circuit board 122 and electrical connectors 124 which communicate from the user interface means to the carousel rotation means and the ejector to dispense the desired disk. The circuitry 120 may include a central processing unit or suitable memory chips as needed to control the vending machine, including rotating the carousel to any specific slot location.

Figure 5:
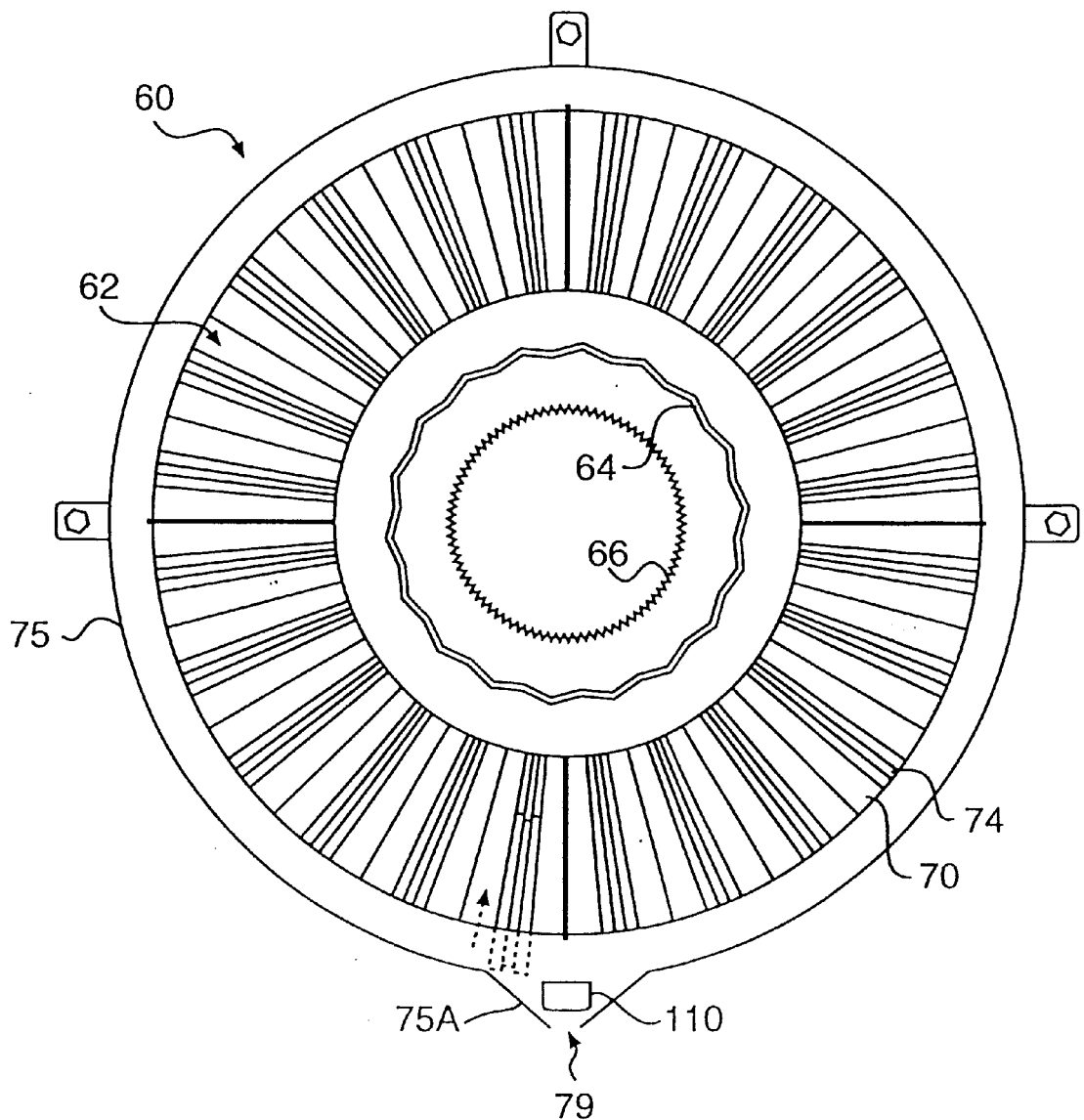
FIG. 5 is a top view of the carousel of the present invention.

FIG. 5 shows a top view of the carousel 60 of the present invention comprising carousel body 62 having first gear receptacle 64 and second gear receptacle 66. Carousel 60 further includes a plurality of retaining slots 70 which hold the inner tracks 74 which in turn hold the disks in vertical position. As can be seen, carousel 60 is preferably divided into four quartered sections wherein the first gear 82 can be used to rotate the carousel to a desired one of the four sections, at which time the second gear 92 can be used to rotate the carousel to any particular retaining slot within any one of the four sections. It should be understood however that one gear, shaft and motor could be used to rotate the carousel instead of the preferred two gears, shafts and motors.

The carousel 60 is preferably surrounded by a retaining wall 75 which prevents inner tracks 74 from unintentionally sliding from slots 72. Retaining wall 75 includes an opening 79 to allow a selective disk to pass through the opening and out the dispensing opening. Retaining wall 75 includes angled sections 75a at the opening which provides a camming surface utilized to push track 74 back substantially into its slot 70 after a disk has been dispensed and the carousel rotated as illustrated in phantom and by the phantom arrow. At the opening of the retaining wall, security means 110 is provided as will be described in more detail with reference to FIG. 9.

Figure 6:
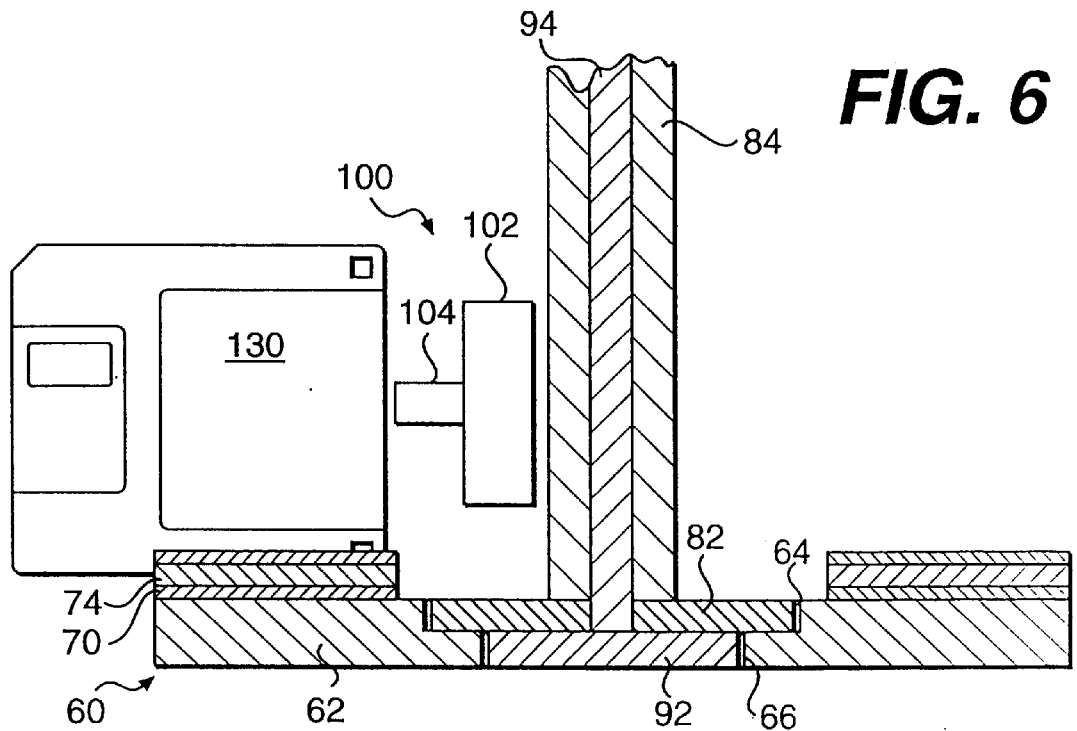
FIG. 6 is a side cross-sectional view of the carousel's rotation means of the present invention.

Referring now to FIG. 6, carousel 60 includes carousel body 62 having first gear receptacle 64 and second gear receptacle 66 therein and further including retaining slots 70 and inner tracks 74 slidably movable therein which contain the disk slots 76 (See FIGS. 7, 8) for receiving disk 130 in an upright position. First gear 82 is shown in first gear receptacle 64 and being connected to first gear shaft 84. Second gear 92 is shown in second gear receptacle 66 and being connected to second gear shaft 94. Ejection means 100 are further shown including hydraulic piston 102 and pusher element 104 which contacts disk 130 to propel the disk out of the cabinetry. The ejection means 100 is preferably mounted to gear box 99 in any suitable manner.

Figure 7:
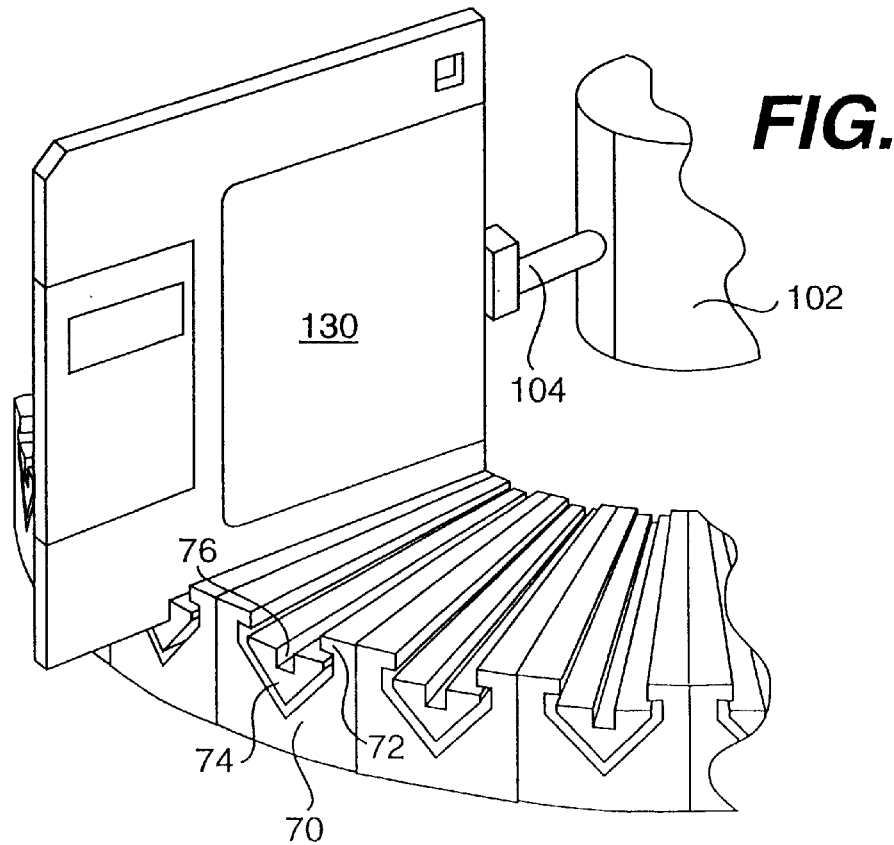
FIG. 7 is a partial view of the carousel and the ejector system of the present invention.

Referring now to FIG. 7 which illustrates a partial view of the carousel and the ejector system 100 of the present invention. Carousel 60 includes retaining slots 70 having fingers 72 therein which retaining slots 70 receive an inner track 74 slidable therein. The inner track 74 includes a disk groove 76 which receives one end of a disk and holds the disk in an upright position as illustrated. Disk groove 76 can preferably contain rubber grips 78 or a rubber lining 78 (FIG. 8) so as to securely hold disk 130 in its upright position. Hydraulic piston 102 of ejection means 100 is operated upon receiving a signal from the circuitry 120 at which time pusher element 104 is actuated to push disk 130 outward causing inner track 74 to slide outward of retaining slot 70. As can be seen in FIGS. 6 and 7, disk 30 preferably extends out from the track 74 such that once inner track 74 slides partially out of retaining slot 70, disk 130 passes through the opening 79 in retaining wall 75 and extends out from dispensing opening 25 such that a user is free to grasp the front edge of the disk and pull the disk out from the disk groove 76 of the inner track 74. Upon further rotation of the carousel, inner track 74 contacts and rides along the camming surface 75a of the retaining wall 75 and is thus returned back into the retaining slot 70.

Figure 8:
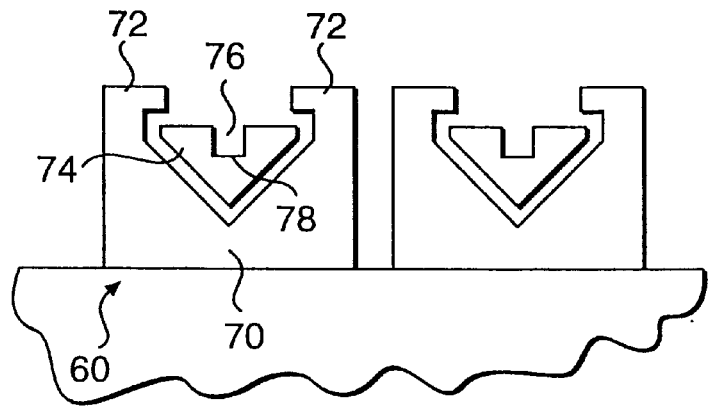
FIG. 8 is a side view of the slots of the carousel of the present invention.

FIG. 8 illustrates a side view of the retaining slot 70 having the inner track 74 therein. Retaining slot 70 is shown having inwardly projecting fingers 72 which partially cover the inner track 74 thus preventing inner track 74 from being displaced upward and out of retaining slot 70. Inner track 74 can be seen inside retaining slot 70 and includes a disk groove 76 for receiving an end of a disk and holding the disk in an upright position. Disk groove 76 is preferably slightly greater in width than the side of a disk such that the disk may be snugly positioned in disk groove 76 and held therein by friction. Disk groove preferably contains gripping material 78 to add additional support in holding the disk in an upright position.

Figure 9:
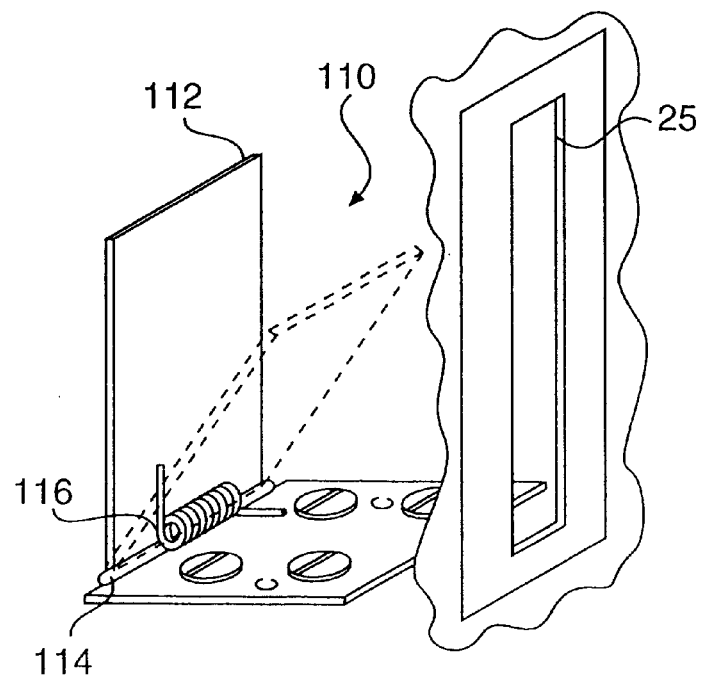
FIG. 9 is a perspective view of the security means of the present invention.

FIG. 9 illustrates the security means 110 of the present invention which is positioned in the opening 79 of the retaining wall just in front of the dispensing opening 25. The security means 110 includes a gate 112 which is pivotable about pivot 114 in a forward direction toward dispensing opening 25 such that when disk 130 is displaced towards dispensing opening 25, the disk contacts gate 112 and lowers it to allow the disk to freely pass through the dispensing opening. Once the disk is removed and the inner track 74 is biased back into retaining slot 70, the gate is biased via torsion spring 116 back up into its vertical position. Gate 112 is limited in any suitable manner from being pivoted backward. Thus, any attempt to access the inside of the vending machine housing 20 through the dispensing opening 25 is impeded.

In use, a user inserts proper payment through the bill accepter and then makes his or her desired selection via selection buttons 52. Should the user's desired selection not be available in indicator light 54 would be lit to indicate the same. Upon making a selection, a signal is sent to the circuit board 122 which determines the specific location(s) of the selected disk within the disk carousel, at which time a signal is sent through electrical connectors 124 to the carousel rotation means 80 which rotates the carousel 60 via first and second gears, gearshafts and motors to the desired disk location such that the disk is moved in front of the opening 79 in the retaining wall 75 and in front of the dispensing opening 25. Ejection means 100 is then activated wherein the hydraulic piston 102 actuates pusher element 104 to contact the selected disk and displace the disk and inner track 74 outward, tripping gate 112 and propelling disk 130 through the opening in the retaining wall and partially out of the dispensing opening 25. The user is then free to grasp disk 130 and remove it from inner track 74 and the vending machine 20, at which time the inner track 74 is biased back into the retaining slot 70 upon further rotation of the carousel via contact with the camming surface 75a of retaining wall 75. Then, the machine is free to be used again by a user.

It is to be understood that the embodiments herein described are merely illustrative of the principals of the present invention. Various modifications may be made by those skilled in the art without departing from the spirit or the scope of the claims which follow. For example, it is foreseen that the present invention could be made to accommodate any type of data storage media for computers, such as for example, backup cartridge tapes, recordable compact digital disks such as the SONY™ Mini-Disc, or memory cards/cartridges for video game systems such as the SONY™ Play Station. Additionally, it should be understood that the principals of the present invention may be suitable for use in other industries apart from the computer industry.

What is claimed is:

1. A vending machine for vending data storage disks, said machine comprising:

carousel means inside said machine for holding said disks, said carousel means including a plurality of retaining slots, and said plurality of retaining slots each receiving an inner track slidable therein, said inner track including a groove for receiving and holding an edge of a storage disk;

carousel rotation means inside said machine for positioning said disks; and ejection means inside said machine for dispensing said disks from said machine, said ejection means including a hydraulic piston having a pusher element, said pusher element selectively contacting an edge of a disk to elect said disk through said dispensing opening;

wherein said inner track slides partially out of said retaining slot upon said pusher element contacting said disk.

2. The machine of claim 1, wherein said machine includes a dispensing opening, and said ejection means selectively ejects said disks through said dispensing opening.

3. The machine of claim 2, wherein said machine includes security means at said dispensing opening to impede access to said disks through said dispensing opening.

4. The machine of claim 3, wherein said security means comprises a one-way gate, said gate being lowered upon said ejection means ejecting said disks and thereafter being biased to its closed position by spring means.

5. The machine of claim 1, wherein said carousel means includes at least one gear receptacle, and wherein said carousel rotation means includes a first gear cooperatively associated with said at least one gear receptacle, a first gear shaft attached to said first gear, and a motor operatively connected to said gear shaft for selective rotation of said carousel means.

6. The machine of claim 1, further including a retaining wall surrounding said carousel means.

7. The machine of claim 6, wherein said retaining wall includes a wall opening at said dispensing opening of said machine.

8. The machine of claim 7, wherein said retaining wall includes an angled portion at said wall opening, said angled portion acting as a cam to bias said inner track back into said retaining slot upon rotation of said carousel means.

9. The machine of claim 1, further comprising user interface means for providing operating signals to said carousel rotation means and said ejection means via electrical connectors.

10. The machine of claim 9, wherein said user interface means includes means for receiving payment and means for selecting said disks.

11. A vending machine for products, said vending machine comprising:

at least one carousel having a plurality of slots, said slots each receiving an inner track slidable therein, said inner track releasably holding said products;

a user interface having a means for accepting currency and a means for selecting said products;

at least one motor and gearing system for rotating said at least one carousel, said at least one motor and gearing system responsive to an electrical signal generated by said means for selecting; and an ejector apparatus for dispensing said products through an opening in said machine, said ejector apparatus responsive to an electrical signal generated by said means for selecting;

wherein said inner track slides partially out of said slot upon said ejector apparatus dispensing said products.

12. An improved vending machine comprising:

a carousel for holding products;

a carousel rotation means for rotating said carousel so that a desired product is dispensed through an opening in the machine by an ejector apparatus;

a plurality of slots in said carousel; and an inner track slidably mounted in each of said slots, said inner track receiving said products;

wherein said inner track slides partially out of said slot when said ejector apparatus dispenses said product.

* * * * *